INVENTOR
Ralph R. Shaw,
BY Parker and Walsh
ATTORNEYS

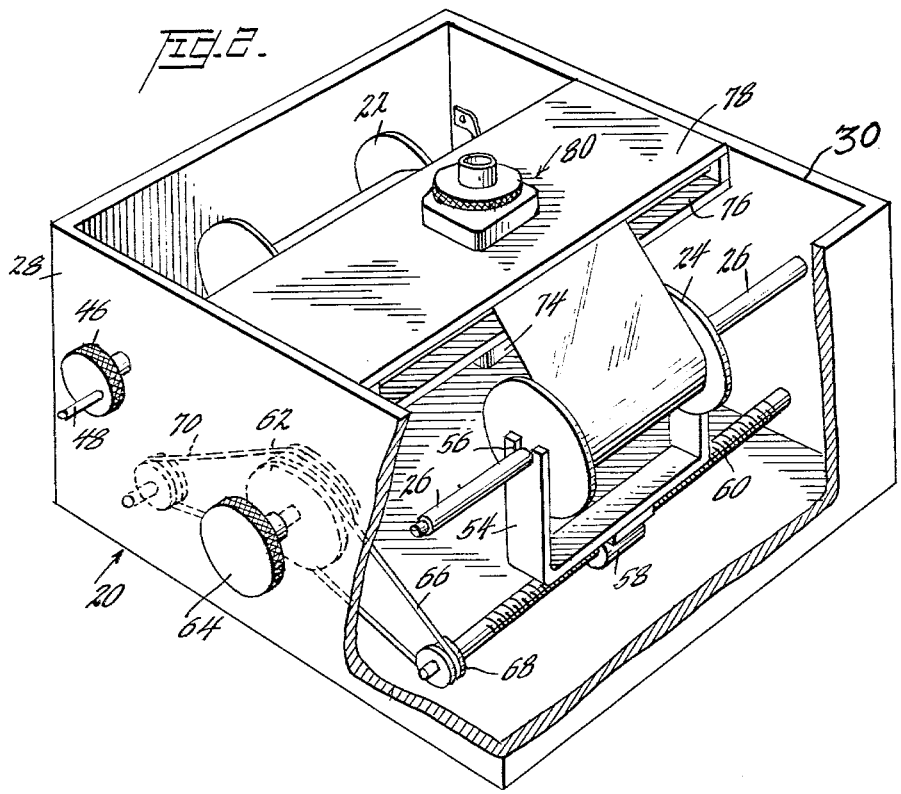
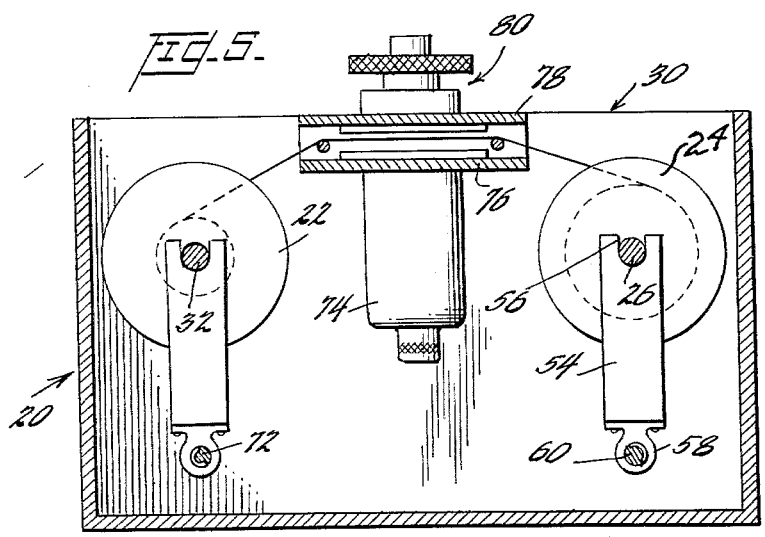

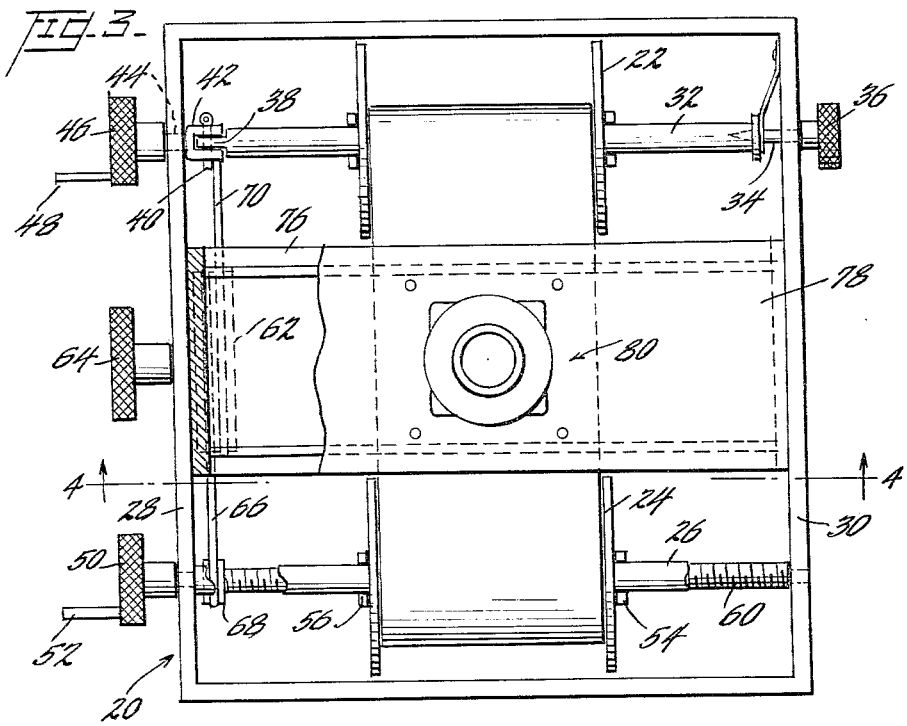
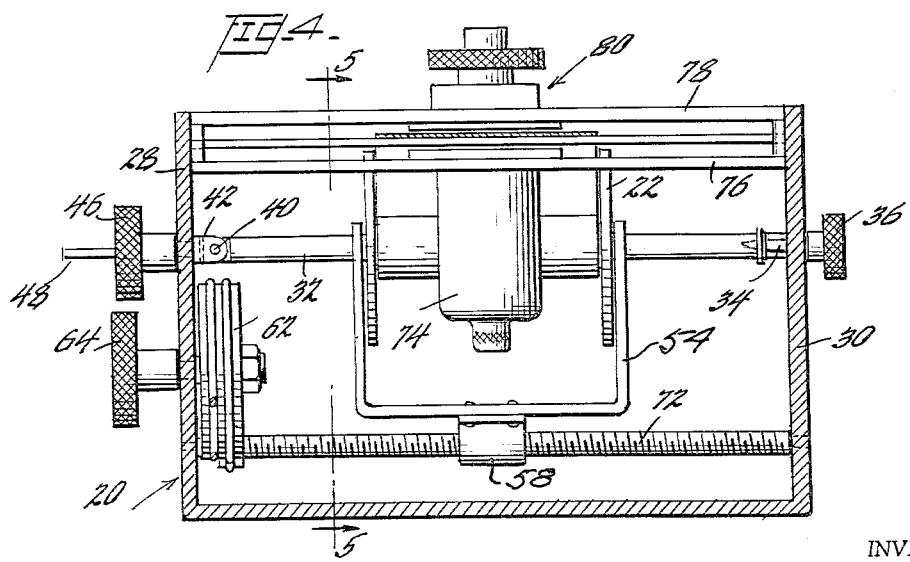

United States Patent Office 3,229,396
Patented Jan. 18, 1966

3,229,396
MICROFILM AND VIEWING APPARATUS
THEREFOR
Ralph R. Shaw, New Brunswick, N.J.
(429 Portlock Road, Honolulu, Hawaii 96821)
Filed Oct. 10, 1963, Ser. No. 316,201
5 Claims. (Cl. 40—86)

This application is a continuation-in-part of my application, Serial No. 36,619, filed June 16, 1960, and now abandoned.

This invention relates to microfilming, and comprises a novel system of storing large amounts of information in a much more compact form than has been heretofore possible, while at the same time providing readier access to the material stored.

In the known methods of microfilming, the indexing and finding of specific material have constituted a major drawback, and many attempts have been made to solve the difficulties. For the most part these proposed solutions have proceeded along two main lines, either employing finding devices incorporated in the film and involving expensive and complicated electronic or mechanical scanning devices, or a system in which the film is unitized into smaller, discrete pieces such as microcards, microprint sheet microfilm, window insert cards, and the like. The latter approach sacrifices the merits of the intact nature of a film roll and, among other things, may result in misfiling or loss of film parts, or at least an occasional unavailability for a period of time. It also is time-consuming in respect to the finding and the refiling of the film parts.

It is therefore an object of the present invention to consolidate microfilm records to a degree representing substantial improvement over known methods.

A further object is to provide micro records adapted for quick and easy location of specific, stored information. More particularly, it is an object to store the contents of a plurality of multivolume reference works in compact and orderly form on a single roll of film in a manner which permits finding any page in any volume in a very brief period of time and with a minimum of effort.

A still further object is to reduce the labor and expense of publishing reference works, while facilitating their handling and use.

These and other objects which will be readily apparent are fully accomplished by the present invention, which may be briefly described as a system in which the roll film is considerably wider than is customary, and which carries the reduced reproduction of reference books, with the contents of respective volumes in columns in side-by-side relation across the width of the film and each running longitudinally of the film. In addition to this convenient arrangement the facility of finding is enormously increased by having the identical page numbers for the respective volumes all aligned, in each case, in a single row across the width of the film.

For a more detailed description of the invention, reference is made to the following specification, as illustrated in the drawings, in which:

FIGURE 2 is a perspective view of a projection machine, with finders, utilizing the type of film record shown in FIGURE 1;

FIGURE 3 is a top plan view of the machine of FIGURE 2, with parts broken away;

FIGURE 4 is a sectional view taken along the line 4—4 of FIGURE 3; and

FIGURE 5 is a vertical transverse section on line 5—5 of FIGURE 4.

Figure 1:
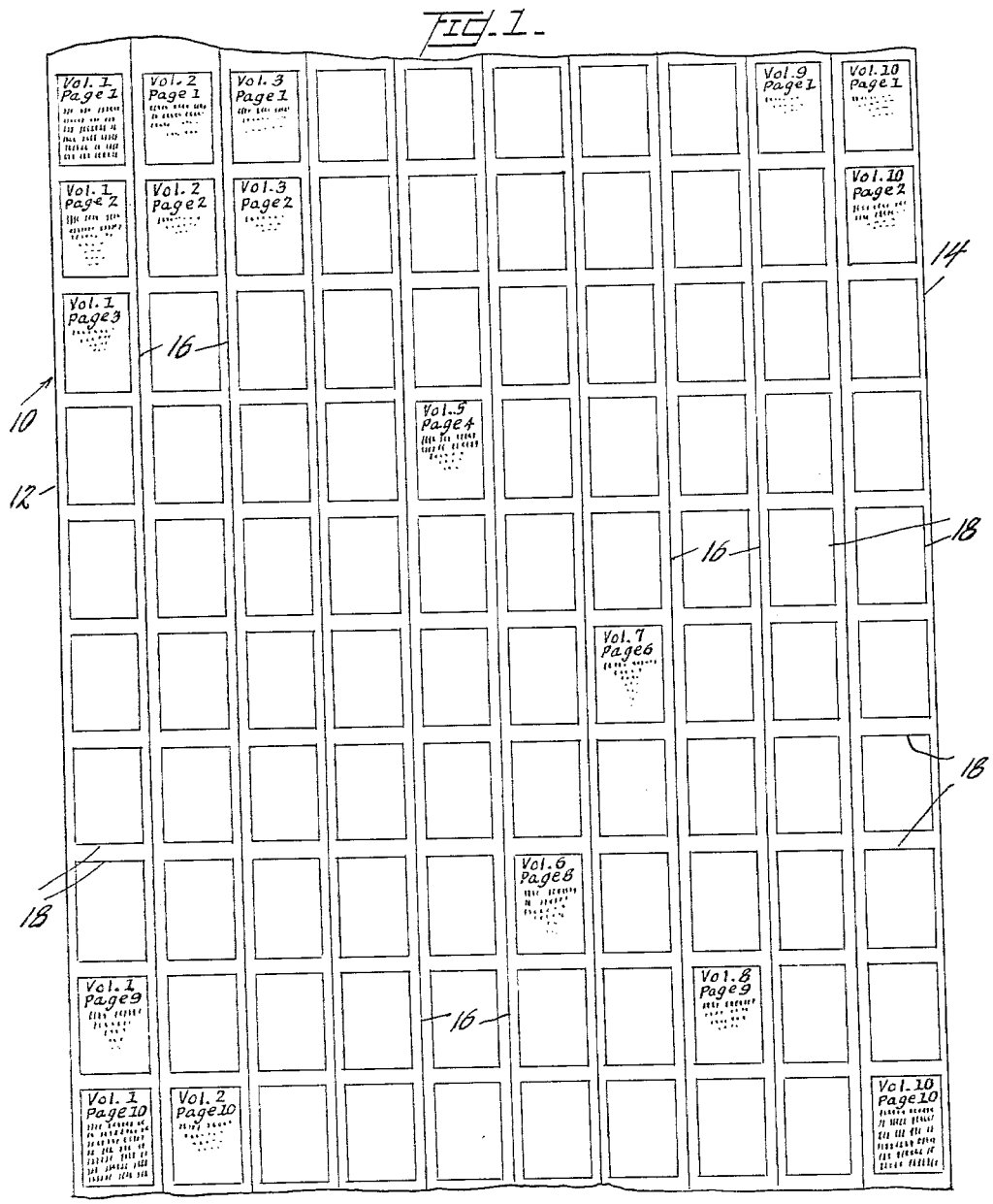
FIGURE 1 is a plan view of a fragment of film roll showing the column and row arrangement of the pages of stored information.

Referring to the drawings by characters of reference, there is shown, in FIGURE 1, a fragment of film roll 10, with side edges 12 and 14, and divided into columns defined by parallel lines 16 running lengthwise of the film. Lines 16 conveniently illustrate the column arrangement, but are not strictly necessary. They may be introduced as a part of the image in printing the film or they may be incident to a splicing operation in one manner of processing of the film. The images of the respective pages of the stored reference work are seen as comprised within the confines of rectangular borders 18 occurring in spaced relation, lengthwise of the film, in each column, and forming rows across the film in which the upper and lower borders of the rectangles are respectively aligned. Since the scale of the drawing is insufficient to make the reading matter distinguishable the contents of the pages are shown in schematic form. However, in order to bring out an important aspect of the invention, the column number and page number pertinent to each page has been shown, in exaggerated form, and in an arrangement different from that in which they would appear in the actual case.

The orderly arrangement with respect to volumes and pages, which may be likened to a system of rectangular coordinates, will be seen as affording a ready means of reaching specific information on the film, as desired. In support of this result, the system may be accompanied by a master index, either printed on the same film or a separate film, or which may be provided in book form.

In the form of the invention illustrated, ten columns of printed frames have been shown, but the columns may be included in greater number, as the number of volumes in the reference work shall call for. For instance, on a film of the order of 75 mm. to 125 mm. in width, there may be as many as 15 to 30 columns, depending upon the reduction ratio and the given size of film. Using a 40-diameter reduction ratio, for example, a 30-volume encyclopedia could be put onto a 125 mm. film in 30 columns. The total length of the film required for the entire set would be approximately 20 feet. Also, five different encyclopedias, each of 30 volumes, could be stored on a 100 feet long roll of film. The overall dimensions of a storage machine intended for the finding and viewing operations would be less than one-half of a cubic foot.

The technique of preparing the master negative roll film of the work forms no part of the present invention, and any of several known methods and processes will be available. For instance, broadly speaking, the photography may encompass the pages of several volumes in one "take," crosswise on a single, integral film, or they may be "shot" separately, using a suitable masking system. Also, the respective columns may be accomplished on separate, narrow film rolls, and then spliced together along longitudinal edges. From this negative the positives may be taken, by contact printing, to any desired number.

For storing and viewing the film, there is provided a device whose novel elements of structure are keyed to the feature of rectangular coordinates in the system, as alluded to above. Thus, in FIGURES 2 and 5 there is shown a rectangular, box-like housing 20 enclosing a film storage spool 22 and a take-up spool 24. The latter is permanently mounted in the housing on a shaft 26 on which it freely slides, and which is supported in opposite sides 28, 30 of the housing. Supply spool 22 is similarly slidable on a shaft. The shaft 32 is arranged for removal and replacement of the spool, in much the same manner as the take-up shaft in a simple camera. To this end there is provided a retractable pin 34 passing through the wall 30 of the cabinet to engage a central recess in the end of shaft 32, and having a handling knob 36 externally of the cabinet. The other end of shaft 32 has a flat tongue 38 secured by a pin 40 in a channel 42 in the inner end of a stub shaft 44 journalled in the wall of the cabinet and having a handling knob 46 on the outer side of wall 28, which knob may be provided with a crank 48. This constitutes a rewind crank, and for take-up the shaft 26 is keyed to a similar, exterior knob 50 with a crank 52. It will be understood that this operation may be powered, if desired, and that the shafts 26, 32 or their knobs may be interconnected, as by belt or chain, for rotation in unison. In the construction shown, both the spools 22 and 24 rotate with, as well as sliding on their respective shafts as the knobs 46 and 50 are operated. If desired, they may be clutched to their shafts so that the paying-out spool rotates freely while the winding spool is positively driven. In this, as in the illustrated construction, both spools slide along the shafts. The drive just described is designed to advance the film along its length to bring the desired row of frames into the projection area, that is, the row having the desired page number.

For selecting the desired column, cross-wise of the film, means are provided to move the spools in unison, in sliding movement along their respective mounting shafts. Considering the take-up spool 24, this mechanism consists of a U-form strap 54 with its legs engaging the end flanges of the spool in containing relation, and having slots 56 in their upper edges receiving the shaft 26. Riveted to the central section of strap 54 is a rider 58 having a threaded bore by which it is mounted on a screw shaft 60 journalled in opposite walls 28, 30 of the cabinet. Rotation of screw 60 results in translation of strap 54 and thus the spool may be moved laterally, in either direction. The carriage for moving supply spool 22 laterally is similar to that for spool 24 and therefore needs no further description.

The lateral movement of the two spools is coordinated by any convenient means, such as a pulley 62, crank knob 64, belt 66 running to a pulley 68 on screw shaft 60, and belt 70 similarly applied to the other screw shaft 72.

The optical system, which is conventional and therefore shown in general outline only, will comprise a housing 74 fixed to a lateral plate 76 fixed to and spanning the cabinet, and which with a spaced, parallel, upper plate 78 forms a gate through which the film is trained and is held in the plane of focus. The housing 74 will contain a suitable light source and condensing lens, and cooperating optical units of the projection system will be contained in a housing 80 carried by the upper plate 78. The system may be designed for projection on a screen, wall or ceiling, using appropriate mirrors and the like, or it may have a built-in screen.

The system above described provides a novel medium for publication of encyclopedias, or reference works in general. Instead of a voluminous set of books in the home, the subscriber is burdened only with a small cabinet. Furthermore, the system is much less vulnerable to wear and tear and aging, and is much more facile in use than is a set of books. This is especially true with respect to the aged and infirm, who are notorious users of books.

From both the publisher's and the user's stand-point there is a tremendous advantage in that the need for periodic "editions" is obviated, since revision may be made by the simple expedient of photographing the revised portions and substituting them into the master negative by splicing. Reprinting the entire, revised film, as many copies as necessary, is relatively simple and inexpensive. Thus, reference works may be kept up to date without the need for supplements or annual volumes, and the attendant, costly plates.

While certain preferred forms of the invention have been presented herein, these are mainly for purposes of necessary illustration, and the invention should not be deemed as limited except as shall appear from the spirit and scope of the appended claims.

I claim:

1. A device for storing and viewing with universal access, roll form microfilm having a plurality of columns arranged longitudinally of the roll, said device comprising a housing, storage and take-up spool means for the film within the housing, said take-up spool means permanently installed within said housing, an axle, said storage spool means mounted on said axle, first connecting means on the outer ends of said axle, means removably securing said axle in said housing comprising a pair of knobs journalled through said housing, one to each end of said axle, and second connecting means on said knobs, detachably mating with said first connecting means, first means mounting said spool means for joint movement of both spool means, laterally of the longitudinal direction of the roll, means to selectively position said pair of spool means in said lateral movement and second means for transferring and guiding the movement of the roll of film between storage and take-up spool means, said first and second means being independently actuatable to permit direct access to any predetermined portion of any column of the stored film.

2. A device for storing and viewing, with universal access, roll form microfilm having a plurality of columns arranged longitudinally of the roll, said device comprising a housing, a pair of parallel, spaced-apart axles therein, a storage and a take-up spool mounted one on each axle, said storage spool axle having a recess formed in one end thereof and a flat tongue formed in the opposite end thereof, means removably securing said storage spool axle in said housing comprising a first knob in said housing having a retractable pin mating with said recess, a second knob in said housing having a channel mating with said tongue, and a pin removably securing said tongue in said channel, means for transferring film between the two rolls, viewing means, including guide means through which the film may pass, located between the two axles and means for jointly displacing the rolls axially along the axles, said transfer means and said displacing means being independently operable.

3. The device of claim 2 wherein the displacing means includes a pair of forked elements embracing and engaging the flanges of the spools and means for moving said forks simultaneously in directions parallel to the axes of the axles.

4. The device of claim 2 wherein said viewing means comprises a light source, internally of said device, and an optical unit externally of said device and cooperating with said light source, said guide means located between said light source and said optical unit.

5. The device of claim 3 wherein said means for moving the forks simultaneously comprises a pair of internally threaded riders, secured one to each fork, therebeneath, a pair of screw shafts one through each rider and journalled in said housing, beneath said axles, a control knob journalled through said housing, and pulley means secured to said control knob and said shafts whereby said shafts rotate in unison by rotation of said control knob.

(References on following page)

References Cited by the Examiner

UNITED STATES PATENTS

| | | | |
|---|---|---|---|
| 958,367 | 5/1910 | Clawson | 352—239 |
| 1,109,575 | 9/1914 | De Giglio | 352—82 |
| 1,127,382 | 2/1915 | Featherstone | 352—234 |
| 1,557,597 | 10/1925 | Lube | 352—82 |
| 2,033,529 | 3/1936 | Lee | 40—95 |
| 2,374,935 | 5/1945 | Higgins | 40—86 |
| 2,657,487 | 11/1953 | Sprung | 40—86 |
| 2,746,419 | 5/1956 | Serge | 40—86 X |

References Cited by the Applicant

UNITED STATES PATENTS

| | | |
|---|---|---|
| 1,109,575 | 9/1915 | De Giglio. |
| 1,557,597 | 10/1925 | Lube. |
| 2,163,092 | 6/1939 | Hobbs. |

EUGENE R. CAPOZIO, *Primary Examiner.*

JEROME SCHNALL, LAWRENCE CHARLES, *Examiners.*

JOHN W. WILL, WILLIAM GRIEB, *Assistant Examiners.*